April 11, 1967 V. S. GOLEMON 3,313,480
ACCUMULATOR STATE CONTROL POSITIONING MECHANISM
Filed July 12, 1965 4 Sheets-Sheet 1
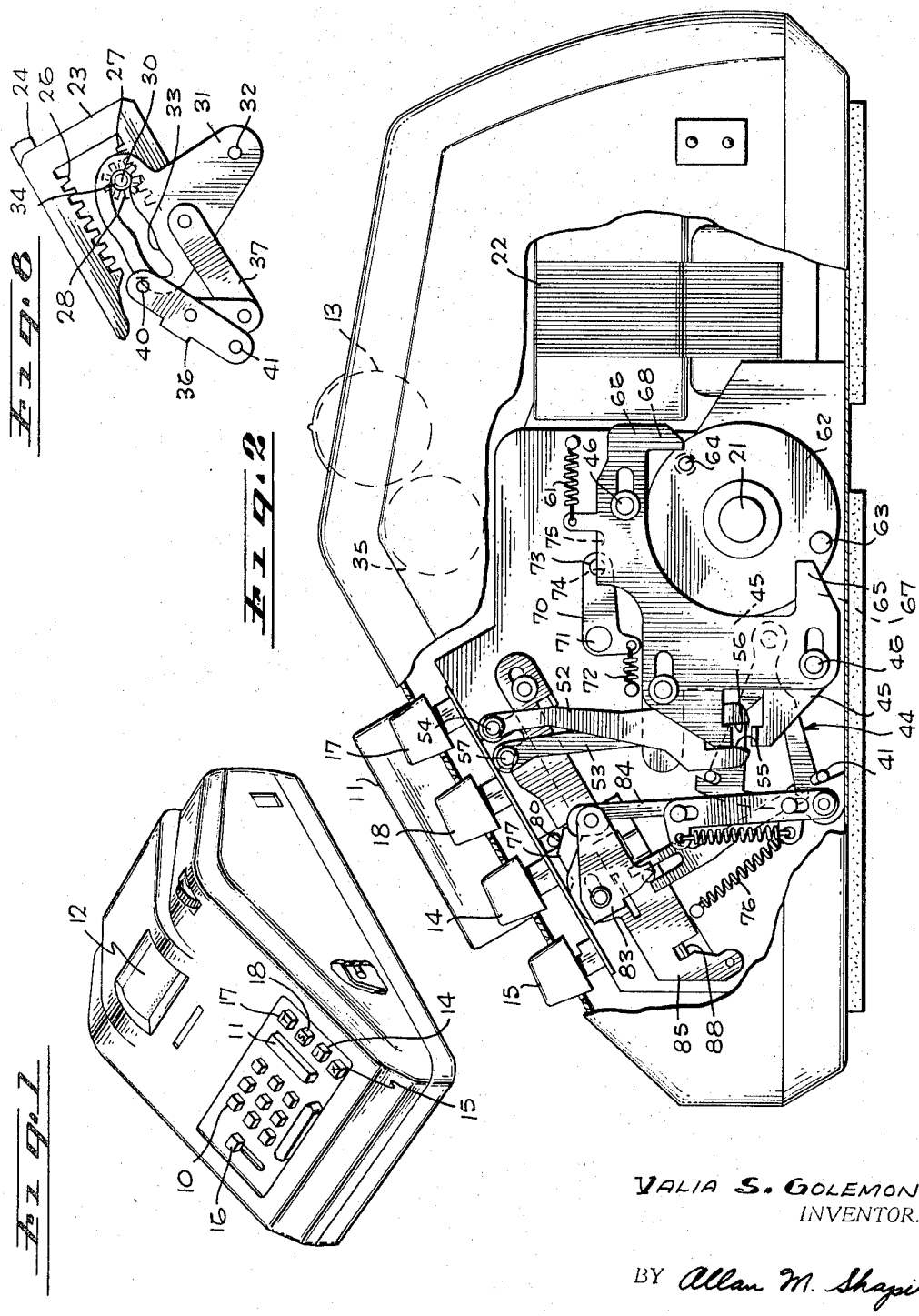
VALIA S. GOLEMON
INVENTOR.
BY Allan M. Shapiro
ATTORNEY

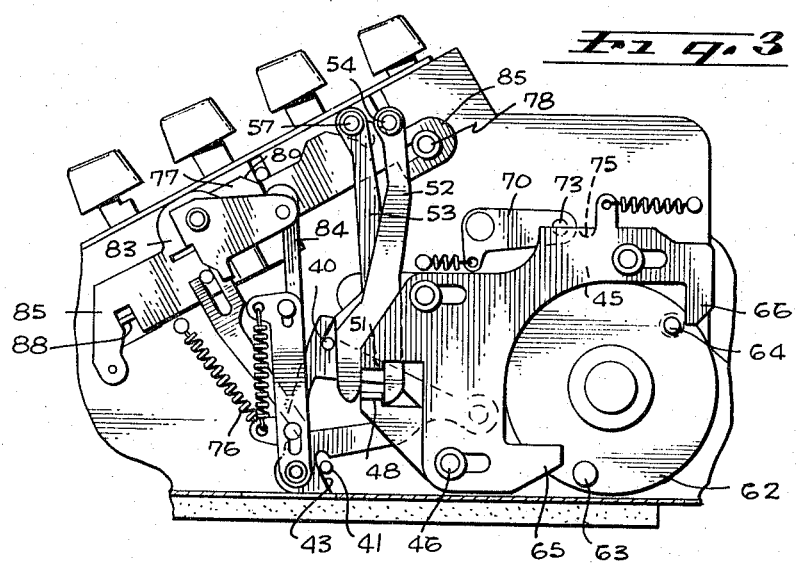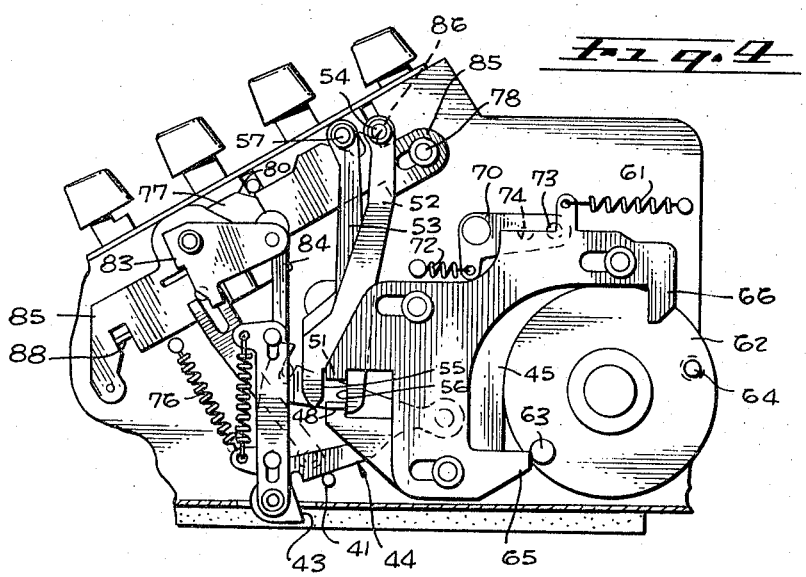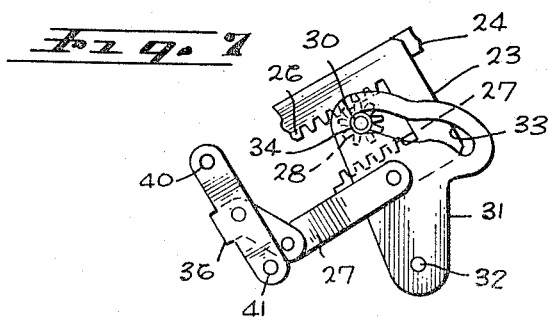

April 11, 1967     V. S. GOLEMON     3,313,480

ACCUMULATOR STATE CONTROL POSITIONING MECHANISM

Filed July 12, 1965     4 Sheets-Sheet 3

VALIA S. GOLEMON
INVENTOR.

BY Allan M. Shapiro

ATTORNEY

April 11, 1967  V. S. GOLEMON  3,313,480
ACCUMULATOR STATE CONTROL POSITIONING MECHANISM
Filed July 12, 1965  4 Sheets-Sheet 4
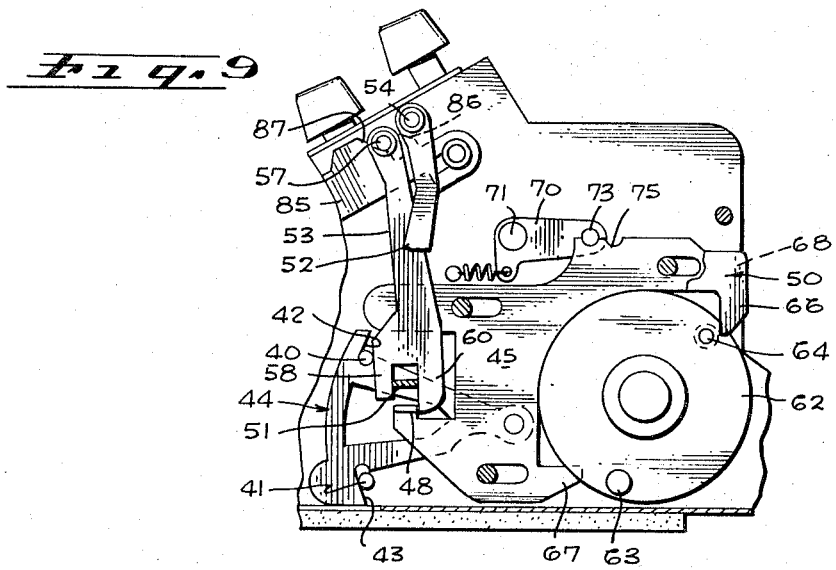
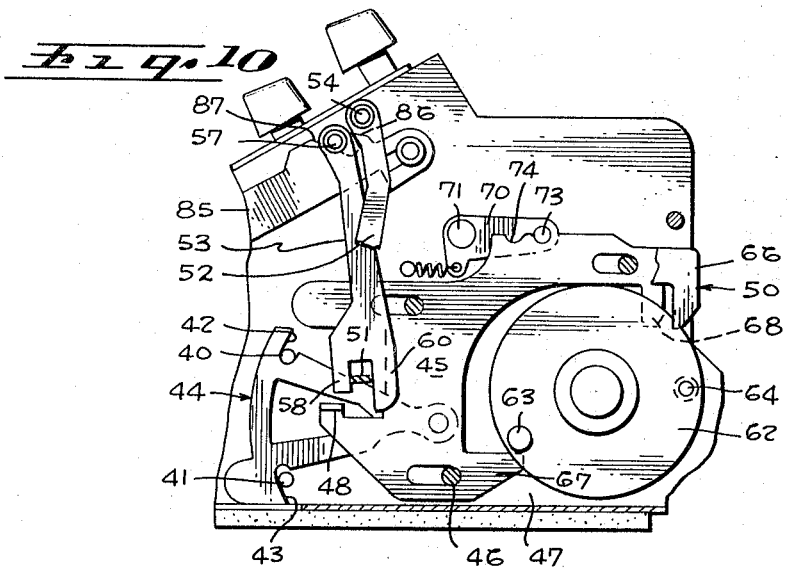
VALIA S. GOLEMON
INVENTOR.
BY Allan M. Shapiro
ATTORNEY

:::::::::::::::::::::::::::::::::::::::::::::::::::::::

United States Patent Office 3,313,480
Patented Apr. 11, 1967

3,313,480
ACCUMULATOR STATE CONTROL POSITIONING MECHANISM
Valia S. Golemon, 14 Araki-cho, Shinjuki-ku, Tokyo, Japan
Filed July 12, 1965, Ser. No. 471,369
16 Claims. (Cl. 235—60)

This invention relates to calculating machines and has particular reference to machines commonly known as adding machines which are capable of adding and subtracting and recording the factors and results of such calculations. However, it is to be understood that at least certain phases of this invention may be applicable to other types of calculating machines, for example, those machines capable of automatically performing multiplication and/or division calculation.

One object of the present invention is to facilitate control of a calculating machine and consequently reduce the strain on an operator when operating the machine over long periods of time.

Another object is to simplify the controls of a calculating machine so as to eliminate various resilient and spring type members generally employed by the prior art.

Another object of the present invention is to facilitate repetition of different types of calculations through a novel control linkage means interconnected between the keyboard, the machine accumulator, and the drive means therefor.

Still another object of the present invention is to provide a novel accumulator state control mechanism operable in response to a sliding control linkage rather than by eccentric cam movement as generally employed by the prior art.

Still a further object of the present invention is to provide rectilinear slidable means operable in response to rotary driving means to condition the accumulator to multiple states in order to accommodate a variety of different types of calculations and machine operations.

A further object of the present invention is to provide a novel reciprocating control means for selectively setting the state of the accumulator into one of three conditions whereby the control means includes a two position hook member to set or determine the state of the accumulator.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a perspective view of a machine embodying the preferred form of the invention having a portion thereof broken away to illustrate the control linkage;

FIGURE 2 is a side elevational view of the machine of FIGURE 1 having a portion of the side broken away to illustrate and expose portions of the novel control linkage mechanism and driving means therefor for changing the accumulator state and showing the mechanism in its neutral or at rest position;

FIGURE 3 is a fragmentary side view illustrating the control linkage and initial operation thereof after depression of the total key;

FIGURE 4 is a view similar to FIGURE 3 further illustrating the control linkage in an advanced position as driven by the driving means to perform a totalizing function;

FIGURE 7 is a side elevational view of the accumulator set into condition for an addition operation with respect to the keyboard drive rack;

FIGURE 8 is a view similar to that view shown in FIGURE 7 illustrating the accumulator set into condition for a subtraction operation;

Figure 5:
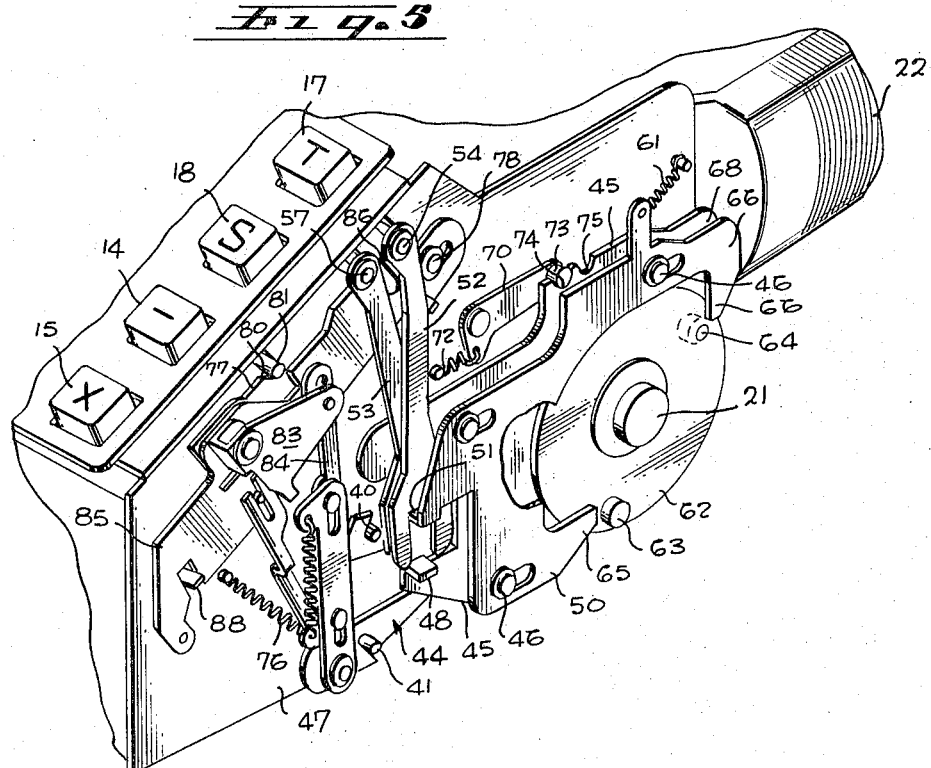
FIGURE 5 is an enlarged perspective view of the accumulator state control mechanism and the driving means therefor.

FIGURE 9 is a fragmentary side view illustrating the control linkage and initial operation thereof after depression of the sub-total key and having portions of the total key link and outer slide member broken away to more clearly illustrate the position of the sub-total linkages; and FIGURE 10 is a view similar to FIGURE 9 further illustrating the control linkage in an advanced position as driven by the driving means to perform a sub-totalling function.

General

The machine is motor driven and the controls are so arranged that each operation control key or bar has complete control of the intended function of the machine so that it is not necessary to first set any conditioning mechanism and then depress a motor control bar. Referring in general to FIGURE 1, an amount to be added or subtracted is entered by depressing appropriate "amount" keys 10 which sets the amount in a suitable intermediate means. In order to add this amount a motor bar 11 is depressed. This amount is then entered or added into an "accumulator" and is also printed on a paper strip 12 fed over a platen 13. Also, the intermediate amount means are automatically cleared. If the amount set on the keys 10 is to be subtracted from an amount stored in the accumulator, a "minus" key 14 is depressed and the accumulator conditioned to subtract.

If it is desired to add the same amount in the accumulator, two or more times as is generally done in multiplying or when duplicates are to be added, a "repeat" key 15 is depressed and held down and the requisite number of additions are made by simultaneous and successive depression of the motor bar. In this operation, the intermediate amount means are not automatically cleared. On the other hand, if it is desired to repeatedly subtract the same amount a number of times from a value carried by the accumulator, the minus bar is repeatedly depressed until the desired number of subtractions are made.

If a wrong amount is set up on the keys 10, the keyboard may be cleared by actuating a "correction" key 16 which clears intermediate amount means without starting the motor.

When it is desired to obtain a total of a number of additions or the net total value of additions and subtractions entered into the accumulator, a "total" key 17 is depressed. This will cause the total to be printed and will clear the accumulator to zero so that it will be in condition to total a subsequent series of additions and/or subtractions. In the event it is desired to obtain a sub-total, that is, if it is desired to obtain a total without clearing the accumulator, a "sub-total" key 18 is depressed. This will print the total but will retain the latter in the accumulator so that subsequent values may be added to or subtracted therefrom.

It will be noted on reference to FIGURE 1 that the various control keys and bars are grouped around the amount keys 10 so that an operator, when using the well known "touch" system, may easily span whatever control keys and bars he tends to press along with one or more amount keys to be depressed by the same finger stroke.

Keyboard

The keyboard is of the ten-key type, and each amount key 10 when depressed, sets a stop in the intermediate amount means to limit the movement of an aligned drive rack 23 which both drives the accumulator to enter therein a value corresponding to the value of the depressed key and also sets the printing mechanism to print the said value.

Drive

One of the features of the present machine is the provision of a main shaft 21, as in FIGURE 2, rotatable through 360° during each cycle carrying various control cams for operating different components of the machine including the accumulator state positioning means. The main shaft drives a reciprocating positioning means mechanism for moving the accumulator shaft assembly into various state conditions. Thus, the sliding reciprocating mechanism may be designed to incorporate any desired characteristic which may vary throughout the cycle.

The drive shaft is driven by a motor 22 via a cycle clutch. Since cyclic clutches suitable for the present purpose are well-known in the art, it is not deemed necessary to described the same in detail.

Figure 6:
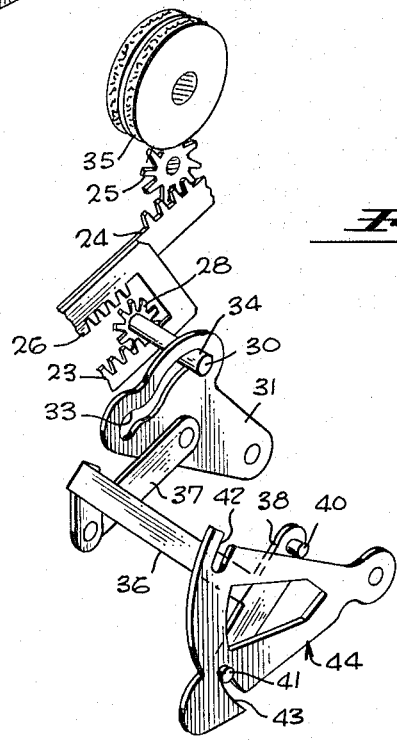
FIGURE 6 is a perspective view of the accumulator state mechanism illustrating the box cam employed for setting the state of the accumulator with respect to the keyboard drive rack.

Means are provided for yieldably transmitting a drive from shaft 21 to the various drive racks represented by rack 23 in FIGURES 6-8 which are located in the different orders of the machine. A rack gear section 24 is formed on the upper edge of each of the racks for the purpose of meshing with one of a series of gears 25 operatively connected with the printer mechanism as seen in FIGURE 6. Also formed on each rack 23 is a pair of opposed rack gear sections 26 and 27 disposed on opposite sides of an associated accumulator gear or element 28 rotatably mounted on accumulator shaft 30 forming part of the accumulator assembly.

Accumulator

The accumulator is of the two-directional subsequent transfer type capable of receiving either addition or subtraction. Referring to FIGURES 6, 7 and 8, inclusive, the accumulator assembly is arranged to be raised or lowered for the purpose of engaging the various accumulator gears 28 with either of the rack gear sections 26 or 27 of the racks 23 in accordance with the type of problem to be performed. During an additive operation, the accumulator is raised to mesh the gear 28 with the upper rack gear section 26 whereby the gear will be rotated in a clockwise direction during the subsequent rearward rack movement, while during a subtractive operation, the accumulator is lowered to mesh the gears 28 with the lower rack gear section 27 so that the subsequent forward rack movement will drive the gears in a counter-clockwise direction.

For the purpose of raising and lowering the accumulator assembly in accordance with the type of problem being performed, a box cam 31 is pivoted on a frame stud 32 and has a cam groove 33 therein embracing a roller 34 rotatably mounted on the shaft 30. Clockwise rocking movement of the cam 31 in a manner to be described hereinafter will raise the accumulator from its central or neutral position to its additive position, while counter-clockwise rocking thereof from its central or neutral position will lower the accumulator to its subtractive position.

Each of the gears 28 has ten teeth thereon, the pitch of which is equal to the increments of movement of the rack from one value to the next so that the rotation of a gear from one tooth to the next represents mechanically the entry or removal of the value of one digit to or from the accumulator.

During the digitizing phase of each operation and as any one of the accumulator gears moves through one complete revolution or ten tooth spaces as the result of accumulating ten digits in its associated order, it conditions a suitable transfer mechanism to subsequently enter one digit into the next arithmetically higher order. That is, if a transfer is made during addition, one digit will be entered into the adjacent left hand gear when viewing the machine from the front by rotating the gear one tooth in a counter-clockwise or additive direction. On the other hand, if a transfer is made during subtraction, one digit will be subtracted from the adajcent left hand gear by rotating that gear one tooth in a clockwise or subtractive direction.

Printer

The printer comprises a series of numeral printing dials or elements 35, as shown in FIGURE 6, equal in number to the number of keyboard drive racks 23. Each numeral dial has thereon a series of type ranging from zero to 9 and these dials are so connected to the associated racks that they will print a digit corresponding to the value of the key depressed in the associated key bank or to move the numerical position to which the rack is moved in its forward stroke.

Referring further, the machine includes a conventional printing ribbon (not shown) which is of the reversable two spool type and may be constructed of cloth, plastic or any suitable material with one or more colors of differently colored sections so that the factors and results of computations being recorded may be printed in colors approximate to the type of operation being performed.

General operation

Operation of the machine and engagement of the clutch detachably connecting the motor to the drive shaft is effected by depression of each of the various control keys except the correction key. As also stated under the heading "Accumulator," the accumulator is raised or lowered to mesh the accumulator gears 28 with either the upper rack gear section 26 or the lower rack gear section 27 of the drive rack depending upon the type of operation to be performed. For this purpose, mechanism is provided which is under control of the different control keys for determining and effecting the positioning of the accumulator. In totalizing operations, the accumulator is returned to zero during the first part of the operation cycle and is then placed in a neutral position in the same manner as normal addition and subtraction operations, while in the sub-totalling operation, the accumulator is returned to zero during the first part of the cycle and is then again reset at its former accumulated value during the latter part of the cycle. Therefore, it is necessary in the latter operation, to maintain the accumulator in mesh with the drive racks until the latter have returned from their forward strokes.

During totalling and sub-totalling operations, the keyboard is not utilized to control the extent of the movement of the racks but instead the racks are controlled by the various accumulator gears included in the accumulator assembly in return from their accumulated increments of rotation to their starting or zero positions.

In normal addition and subtraction operations the intermediate amount means are automatically cleared near the end of each machine cycle, while in a repeat operation, the intermediate amount means are allowed to remain in their set positions throughout the number of repeat cycles during which the repeat key is held depressed.

In totalling and sub-totalling operations, the intermediate amount means must be cleared in advance of the forward movement of the drive racks. For this purpose, the total and sub-total mechanisms cause clearing of the keyboard before the clutch is engaged.

Accumulator controls

As also stated under the heading "Accumulator," the accumulator is raised, as in FIGURE 7, or lowered, as in FIGURE 8, to mesh the accumulator gears such as is represented by gear 28 with either the upper rack gear section 26 or the lower rack gear section 27 of a drive rack 23 depending upon the type of operation to be performed. For this purpose, mechanism is provided which is under the control of the different control keys or buttons for determining and effecting the positioning of the accumulator.

The hereinbefore described box cam 31 which positions the accumulator is pivotally attached to a bail 36, shown in FIGURE 6, via a link 37, having a bar element 38 fixed on one end thereof which carries a pair of pins 40 and 41 arranged on the opposite ends of the bar so as to project through slots or openings in a machine frame 47. These pins are adapted to be selectively engaged by receivers or slots 42 and 43 formed in a selector or hook member 44 pivotally connected on its end opposite to its end carrying the receivers engageable with the pins to a reciprocating hook slide member 45, as seen more clearly in FIGURE 5. The hook slide member 45 is slidably carried on mounting studs, such as stud 46 fastened to the frame 47 and further includes a tab 48 projecting outwardly from the frame.

A second outer reciprocating slide member 50 is slidably mounted on the studs 46 in parallel with the inner or hook slide member which includes a tab 51 projecting inwardly towards the frame in vertical alignment with inner hook member tab 48 when both slide members are at rest in their respective neutral positions. The slide members are detachably coupled together to effect simultaneous reciprocating movement and to effect selective independent movement by means of engagement of either a total key link 52 or a sub-total key link 53.

The total key link is connected on one end to a pin 54 fixed to the total key so that the total link will move down when the key is depressed and will move up when the total key is released at the end of an operation cycle. The opposite end of the total link is bifurcated to provide a receiver opening defined by parallel extensions 55 and 56, as seen more clearly in FIGURE 2, of equal length adapted to engage the tab 51 and to selectively engage the tab 48 which then ties both slide members together for simultaneous movement.

The sub-total key link is pivotally connected on one end to a pin 57 fixed to the sub-total key so that the sub-total link will move up and down when the sub-total key is depressed and subsequently released. The sub-total link is provided with a bifurcated end defined by a pair of extensions 58 and 60 separated by a receiver into which the tab 48 of the hook slide member is selectively inserted and into which the tab 51 of the outer slide member is inserted so as to join both slide members together for reciprocal movement during a sub-total operative cycle. However, it is to be noted that extension 58 is of substantially shorter length than the length of extension 60 so that the two slide members will move together towards the forward end of the machine during the first half cycle of a sub-total operation and yet permit the outer slide member to move rearward under the control of a tension spring 61 during the last half of the sub-totalling cycle.

The forward and rearward reciprocation movement of the slide members is under control of a control disc 62 fixed on the drive shaft 21 driven by the suitable electric motor 22. The control disc is disposed between the slide members and includes a pair of cams 63 and 64 located on the edge marginal region thereof which operate the outer slide member 50 and inner slide member 45 respectively. Cam 63 is arranged to project outwardly from the disc so that rotation of the disc causes cam 63 to strike against a first cam follower portion 65 carried by the outer slide member and/or against a second cam follower portion 66 also carried on the outer slide member depending upon the position of the outer slide member. Cam 64 is arranged to project inwardly from the disc on the opposite side of the disc from its side carrying cam 63 so that rotation of the disc will cause cam 64 to strike against a first cam follower portion 67 carried on the inner hook slide member and/or against a second cam follower portion 68 also carried on the inner hook slide member depending upon the position of the inner hook slide member.

During an additive or subtractive operation and after the slide members have passed their operative positions, the hook member is returned and the box cam is rocked to its neutral position as shown in the figures.

In order to maintain the box cam 31 set in its various states when it is so positioned, a centralizing lever 70 is provided, being pivoted on a frame stud 71 and urged in a clockwise direction by a tension spring 72 to force a roller 73 carried thereby into either a detent 74 or detent 75 formed in the upper edge of the hook slide member.

Normally, when the machine is at rest, the hook member is raised by a tension spring 76, whereby the slot 42 therein embraces the upper pin 40, so that as the hook member is moved forward it will rock the box cam 31 via the bail clockwise to raise the accumulator into its additive position.

For the purpose of locating the hook member 44 in a lowermost or subtraction position, an inner control bar 77 is provided, being supported for longitudinal movement by a pair of frame pins 78. The control bar 77 has a camming surface 80 formed therein and underlaying a pin 81 carried by the minus key. The inner control bar is provided with an ear 82 that engages a pivot lever 83 during forward movement of the bar to actuate a composite linkage 84 connected on one end of the lever and on its opposite side to the hook member so that the hook member is urged down whereby pin 41 is inserted into receiver 43.

The camming surface 80 of the bar 77 is so arranged that upon depression of the minus key, the control bar 77 will be moved forwardly to its fullest extent which, through the lever 83 and linkage 84 will maintain the pin and slot relationship of the hook member so that subsequent forward movement of the hook slide member will place the accumulator into its subtractive position.

To insure that the keyboard intermediate amount means are cleared prior to a totallizing or sub-totallizing operation, an outer control bar 85 is employed which is slidably carried on the frame studs 78 adjacent the inner control bar 77. The outer control bar has a camming surface 86 formed thereon that underlies pin 54 carried by the total key 17 and a camming surface 87 that underlies pin 57 carried by the sub-total key 18. Upon depression of either key 17 or 18, the control bar 85 will be slid forwardly to its fullest extent which carries an element 88 with it which, through releasing mechanism on the keyboard (not shown) clears the keyboard intermediate amount means during the initial portion of the total or sub-total operational cycle.

*Total and sub-total operations*

In totalling operations, the accumulator is returned to zero during the first part of the operation cycle and is then placed in a neutral position during the second half of the cycle, while in sub-totalling operations, the accumulator is returned to zero during the first part of the cycle and is then again reset at its former accumulated value during the latter part of the cycle. Therefore, it is necessary in the latter operation to maintain the accumulator in mesh with the drive racks until the latter have returned from their rearward strokes.

FIGURES 3 and 4 will be referred to now for describing a total operation wherein the total key 17 is pressed which causes the bifurcated end of total key link 52 to extend downward over tabs 48 and 51 so that both tabs are located within the receiver defined by extensions 55 and 56. Thus, the bifurcated end of link 52 ties the slide members 45 and 50 together via the tabs 48 and 51 so that the slide members will move as a unit.

Depression of the total key also closes electrical contacts which energizes the motor 22 and releases the clutch mechanism to permit powered rotation of drive shaft 21. The rotation of the drive shaft is followed by the control disc 62 in a clockwise direction which causes cam 63 to engage the cam follower 65 carried on the outer slide member 50.

Inasmuch as the outer slide member and the inner slide member are coupled together via the bifurcated end of the total link about the tabs 48 and 51, the slide members will move forward as a unit against the tension of return spring 61 as the control disc continues to forcibly engage cam 63 with the cam follower 65. The forward sliding movement of inner member 45 carries the hook member 44 forward because of the pivotal attachment of the hook member to the inner slide member.

As the hook member moves forward, pin 40 which is normally engaged in the receiver slot 42 of the hook member is rotated so that, via the bail 36 and lever 37, the box cam 31 follows the movement of this linkage to raise the accumulator shaft 30 and the accumulator element 28 into the additive position with respect to the rack gear section 26 of the drive rack 23. When the accumulator unit has been positioned to this state, the cam 63 disengages with the cam follower portion 65 so that as continued rotation of drive shaft 21 continues, additional operation in the totalizing cycle are being performed by other elements and mechanisms in the machine. Such operations include the actual printing of the valves stored in the accumulator on the paper strip 12.

At the conclusion of the totalizing operation, cam 63 is now in the position shown in broken lines in FIGURE 4 so that continued rotation of the control disc causes cam 63 to strike against the cam follower 66 located on the rear end of the outer slide member 50. This engagement causes both the inner and outer slide members to slide rearwardly on their mounting studs which action also causes the hook member to move rearwardly and via the linkage connected between the hook member and the box cam 31 causes the removal of the accumulator elements from engagement with the drive racks and relocate the accumulator unit in its non-operative or neutral position. The final step in the totalizing operation is the release of the total key which causes the total key link 52 to move upward so as to free tab 48 carried by the inner slide member from the bifurcated end thereof.

Referring now to FIGURES 9 and 10, the following will relate to a sub-totalling operation wherein the sub-total key 18 is depressed which causes the bifurcated end of the sub-total key 53 to extend downward over both tabs 51 and 48. However, it is to be noted that extension 58 forming a part of the bifurcation does not project past the forward end of the tab 48 while the extension 60 forming the other part of the bifurcation communicates with the rearward side of both tabs 48 and 51.

The depression of the sub-total key also effects the energization of motor 22 and the release of the clutch so that shaft 21 will rotate in a clockwise direction causing the cam 63 to engage the cam follower 65 carried by the outer slide member. As the outer slide member is pushed or forcibly urged forward, the forward end of tab 51 causes the sub-total link 53 to be carried therewith about its pivot 57 so that, via extension 60 and its engagement with the rear edge of tab 48, the inner slide member is also moved slidably forward. Consequently, both the inner and outer slide members are coupled together via the bifurcated end of the sub-total key and the forward rectilinear movement of the slide members causes the hook member 44 to be moved forwardly. The forward movement of the hook member 44 causes the box cam 31 to be positioned via the linkage 36 and 37 and projection 40 so that the accumlator assembly is moved out of the neutral position into engagement with the upper rack gear section 26 representative of the additive state.

As the control disc continues to rotate, cam 63 becomes disengaged with the cam follower 65 and the return spring 61 causes the outer slide member to move rearwardly into its neutral or at rest position. Inasmuch as the bifurcated end of the sub-total linkage 53 couple the inner and outer slide members together only in the forward direction, the inner slide member 45 remains in its advanced forward position as shown in FIGURE 10 so that the hook member and consequently the accumulator unit are maintained in the additive state. It is necessary that the accumulator be maintained in mesh with the drive racks until the drive racks are returned from their rearward stroke to insure that the value previously set in the accumulator will be returned to the accumulator.

During the next phase of the sub-total operation, various mechanisms operate to cause the printing of the sub-total value on the paper strip 12 as the drive shaft continues to rotate in its clockwise direction. Inasmuch as the outer slide member has been returned to its at rest position, cam 63 will pass cam follower 66 without engagement therewith. However, towards the end of the sub-totalling cycle, it is necessary to remove the accumulator unit from mesh with the rack gear section of the drive racks and to this end, the second cam follower 68 which forcibly urges the inner slide member rearward into its neutral or at rest position. The rearward movement of the inner slide member causes the hook member to also move rearwardly to rock the box cam 31 for returning the accumulator unit into its neutral position. The end of the sub-total operation is effected by the release of the sub-total key and the engagement of the clutch to disengage the motor from the drive shaft 21.

During totalling and sub-totalling operations, the keyboard is not utilized to control the extent of the movement of the racks but instead, the racks are controlled by the various accumulator gears in returning from their accumulated increments of rotation to their starting or zero positions. Thus, as the machine continues its cycle, the racks will be driven rearward rotating accumulator gears in a subtractive direction until the accumulator gears are in their zero position. The racks will therefore stand in position mechanically representing the value previously registered by the accumulator and will consequently cause the printer dial to register this value.

The versatility and novelty of the present accumulator control apparatus will be further understood with respect to the following description which will relate to a minus operation wherein the minus key 14 is depressed which causes the pin 81 to ride against the cam surface 80 formed on control bar 77 which causes the control bar to move forward on its mounting studs. The forward movement of the control bar forcibly engages ear 82 as shown more particularly in FIGURE 2 with a portion of pivoting lever 83 so that connecting linkage 84 coupled to the hook member 44 causes a hook member to pivot from its attachment point on the inner slide member downwardly to engage receiver 43 with pin or projection 41.

Depression of the minus key also causes activation of motor 22 and release of the clutch to permit rotation of drive shaft 21 and control disc 62. As the control disc rotates, cam 63 engages with follower 65 to move the outer slide member forward. When the cam 63 disengages with the cam follower, spring 61 will return the outer member to its neutral or at rest position. Inasmuch as the inner slide member is not coupled to the outer slide member, the inner slide member will remain in its at rest position during this portion of the subtractive cycle.

As the control disc continues to rotate, inwardly facing cam 64 strikes against cam follower 67 which moves the slide member 45 forward carrying therewith the hook member for positioning the accumulator unit and its accumulator gears 28 into mesh with the lower rack gear section 27 as indicated in FIGURE 8. During this portion of the cycle, the accumulator will remain in this position as determined by the location of the hook member.

As the control disc continues to rotate, cam 64 strikes against cam follower portion 66 which effects the rearward movement of the inner slide member 45 which carries the hook member rearwardly to reposition the accumulator unit into its neutral position. During the rearward movement of the hook member, return spring 76 urges the hook member to pivot counterclockwise so that its receiver 44 becomes engaged with pin or projection 40.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a calculating machine, the combination with reversable accumulator elements, and drive racks therefor adapted to drive such elements in one or the other of opposite directions, which comprises:
   means including an accumulator positioning member settable into any one of three positions for selectively and relatively adjusting said racks and accumulator elements to permit driving of said accumulator elements in a first direction, a second direction or in a drive-preventing (neutral) position, respectively;
   reciprocating slide means operable to actuate said accumulator positioning member to any one of said positions;
   drive mechanism comprising a first cam and first cam follower for normally operating said actuating means in a predetermined manner whereby to set said accumulator positioning member
   said drive mechanism including a second cam and second cam follower for operating said actuating means in a different predetermined manner whereby to set said member; and
   means for selectively rendering said second cam and second cam follower of said drive mechanism effective or ineffective to operate said actuating means.

2. In a calculating machine, the combination with reversable accumulator elements, and drive racks therefor adapted to drive such elements in one or the other of opposite directions, the combination comprising:
   means including an accumulator positioning member settable into any one of three positions for selectively and relatively adjusting said racks and accumulator elements to permit driving of said accumulator elements in a first direction, a second direction or in a drive-preventing (neutral) position, respectively;
   rectilinear reciprocating slide means operable to actuate said accumulator positioning member to any one of said positions;
   drive mechanism comprising a rotatable first cam and first cam follower for normally operating said actuating means in a predetermined manner whereby to set and re-set said accumulator positioning member;
   said drive mechanism including a rotatable second cam and second cam follower for operating said actuating means in a different predetermined manner whereby to set and re-set said member; and
   means detachably connectable to said actuating means for selectively rendering said second cam and second cam follower of said drive mechanism effective or ineffective to operate said actuating means.

3. The invention as defined in claim 2 wherein
   said actuating means includes a pair of slide members, each of which being provided with a tab; and
   said rendering means having means for detachably coupling with said tabs so that said pair of slide members may be selectively moved as a unit.

4. In a calculating machine, the combination comprising:
   an accumulative positioning member settable into one of three positions;
   means pivotally supporting said accumulator positioning member;
   a selector member for actuating said accumulator positioning member;
   means connected with said selector member for reciprocating said selector member;
   a pair of spaced projections carried by said accumulator positioning member;
   said selector member having a pair of outwardly opening notches arranged on opposite sides of said selector member for selective engagement with one or the other of said pair of projections;
   said selector member being pivotally positionable between two positions to alternately engage one of said notches with one of said projections whereby said accumulator positioning member remains in a neutral position between the two alternate positions;
   spring means for normally positioning said selector so that one of said notches is engaged with one of said projections; and
   slidable reciprocating means operable to actuate said accumulator positioning member via said selector member to any one of said accumulator positions.

5. The invention as defined in claim 4 including:
   drive mechanism for operating said reciprocating means in a predetermined manner whereby to set and reset said selector member;
   said reciprocating means including a pair of parallel spaced apart slide members wherein one of said slide members pivotally supports said selector member; and
   key means detachably connectable to said pair of slide members to couple said slide members together so as to operate as a unit and to decouple said slide members so as to permit independent movement of said slide members.

6. The invention as defined in claim 5 wherein
   each of said slide members includes a first and a second cam follower; and
   wherein said drive mechanism includes a rotatable control disc disposed between said pair of slide members and having a cam on each side thereof for forcibly engaging with said cam followers to actuate said slide members as a unit or independently as determined by said key means.

7. In a calculating machine, the combination comprising:
   an accumulator positioning member settable into one of three positions;
   control linkage pivotally attached to said positioning member;
   a pair of spaced projections carried by said linkage;
   a pivotally mounted selector member for actuating said accumulator positioning member;
   slidable means connected with said selector member for reciprocating and pivoting said selector member;
   said selector member having a portion of less width than the space between said projections;
   said portion having a pair of outwardly opening notches arranged for selective engagement with one or the other of said pair of projections;
   said selector member having an intermediate position in which it is reciprocably relative to said accumulator positioning member with one of said notches engaging one of said projections; and
   means for positioning said selector member so that either one or the other of said pair of projections is engaged in one of said notches.

8. In a calculating machine, the combination comprising:
   an accumulator positioning member having at least three positions;
   linkage means for pivotally positioning said accumulator positioning member;

a pair of spaced projections carried by said linkage means;

a selector member for actuating said accumulator positioning member;

means connected with said selector member for reciprocating said selector member;

said selector member having a portion of less width than the space between said projections;

said portion having a pair of outwardly opening notches arranged for selective engagement with one or the other of said pair of projections;

said selector member having an intermediate position in which it is compatible with the central position of the three positions of the accumulator positioning member in which position either of said notches may be selectively engaged with one of said projections;

spring means for normally positioning said selector member so that one of said notches is engaged with one of said projections prior to the initiation of an operating cycle;

means for positioning said selector member including a pair of sliding members wherein one of said sliding members is operably connected to said selector member; and key means for selectively and detachably connecting said slide members together.

9. The invention as defined in claim 6 wherein each of said sliding members include a tab; and wherein said key means selectively couples said sliding members tabs to permit said sliding members to move as a unit or independently of each other depending upon the machine operation being performed.

10. The invention as defined in claim 6 including coupling means for connecting said pair of sliding members together so as to move as a unit during a particular machine operation and for de-coupling said pair of sliding members so as to move independent of each other during other particular machine operations.

11. An accumulator control apparatus for a calculating machine having reversable accumulator elements and a positioning member for setting the accumulator elements into different predetermined states, which comprises:

a pair of reciprocating slide members movably mounted in spaced parallel relationship to each other for rectilinear travel forwardly and rearwardly;

one of said slide members being adapted to pivotally support the accumulator positioning member;

each of said slide members having a first cam follower located at its midsection on the underside thereof for effecting forward movement of said slide members and a second cam follower located at the rear end thereof for effecting rearward movement of said slide members;

a rotatable control disc disposed between said pair of slide members having a first cam projecting outwardly from one surface of said disc and a second cam projecting inwardly from the other surface of said disc whereby said first cam travels in a circular path into contact with said first and second cam followers carried by one of said slide members and said second cam travels in a circular path into contact with said first and second cam followers carried on the other said slide members; and key means adapted to selectively couple and decouple said slide members so that said slide members will move together as a unit or separately independent of each other.

12. The invention as defined in claim 11 wherein said key means includes a pair of links having one end thereof pivotally supporting each link and having the free end of each of said links formed in a bifurcation;

a tab formed on the forward end of each of said slide members adjacent to each other;

one of said tabs being embraced by the bifurcated end of both of said links; and the other one of said tabs being embraced by a selected one of said pair of links.

13. The invention as defined in claim 12 wherein the bifurcated end of one of said links includes a tab receiving slot defined by parallel extensions of substantially equal length and wherein the bifurcated end of the other of said links includes a tab receiver defined by parallel extensions of unequal length.

14. An accumulator control mechanism for a calculating machine having reversable accumulator elements and an accumulator positioning member comprising:

a pair of slide members movably mounted to move in a forward and a rearward direction;

means pivotally connecting the accumulator positioning member to one of said slide members;

a rotatable control disc disposed between said pair of slide members;

cam and cam follower means carried on said control disc and said pair of slide members, respectively, to effect movement of said slide members responsive to rotation of said control disc;

key means for selectively connecting said slide members together during a portion of the machine operating cycle and adapted to disconnect said slide members during another portion of the machine operating cycle; and the displacement of said cam and cam follower means with respect to each other on said control disc and said slide members being of pre-determined spacing so as to determine the position of the accumulator elements during the operating cycles of the machine.

15. The invention as defined in claim 5 including means for resiliently biasing a selected one of said slide members in a rearwardly direction during the last half cycle of machine operation.

16. The invention as defined in claim 15 including detent means releasably engageable with the other said slide members to maintain said selector member set in its various positions.

References Cited by the Examiner

UNITED STATES PATENTS

| 2,767,907 | 10/1956 | Schwend | 235—60.4 |
|---|---|---|---|
| 2,917,231 | 12/1959 | Stansell | 235—60 |
| 2,927,729 | 3/1960 | Boyden et al. | 235—60.4 |
| 2,989,231 | 6/1961 | Mark et al. | 235—60 |
| 2,989,232 | 6/1961 | Dorman | 235—60 |
| 3,057,550 | 10/1962 | Ammon | 235—60 |

RICHARD B. WILKINSON, *Primary Examiner.*

S. A. WAL, *Assistant Examiner.*